US012648066B2

(12) United States Patent (10) Patent No.: US 12,648,066 B2
Heo (45) Date of Patent: Jun. 2, 2026

(54) LAMP SYSTEM OF MOBILE BODY AND CONTROL METHOD THEREOF

(71) Applicant: HYUNDAI MOBIS CO., LTD., Seoul (KR)

(72) Inventor: Yun Ji Heo, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 79 days.

(21) Appl. No.: 18/583,095

(22) Filed: Feb. 21, 2024

(65) Prior Publication Data

US 2024/0349411 A1 Oct. 17, 2024

(30) Foreign Application Priority Data

Apr. 12, 2023 (KR) ........................ 10-2023-0048021

(51) Int. Cl.
H05B 47/115 (2020.01)
B60Q 1/30 (2006.01)
G05D 25/02 (2006.01)

(52) U.S. Cl.
CPC ............. H05B 47/115 (2020.01); B60Q 1/30 (2013.01); G05D 25/02 (2013.01)

(58) Field of Classification Search
None
See application file for complete search history.

(56) References Cited

U.S. PATENT DOCUMENTS

| | | | | | | |
|---|---|---|---|---|---|---|
| 5,837,994 | A | * | 11/1998 | Stam | ...................... | H04N 25/00 |
| | | | | | | 250/214 D |
| 5,990,469 | A | * | 11/1999 | Bechtel | ................ | H04N 23/661 |
| | | | | | | 348/E3.02 |

| | | | | | | |
|---|---|---|---|---|---|---|
| 6,049,171 | A | * | 4/2000 | Stam | ..................... | G06V 20/584 |
| | | | | | | 250/214 AL |
| 6,281,632 | B1 | * | 8/2001 | Stam | ..................... | B60Q 1/1423 |
| | | | | | | 250/214 AL |
| 6,653,615 | B2 | * | 11/2003 | Bechtel | ................ | B60Q 1/1423 |
| | | | | | | 362/465 |
| 6,906,467 | B2 | * | 6/2005 | Stam | ..................... | B60Q 1/1423 |
| | | | | | | 250/340 |
| 6,924,470 | B2 | * | 8/2005 | Bechtel | ................ | B60Q 1/1423 |
| | | | | | | 250/208.1 |
| 8,536,789 | B2 | * | 9/2013 | Chen | ...................... | B60Q 1/143 |
| | | | | | | 315/81 |
| 9,227,555 | B2 | * | 1/2016 | Kalapodas | ............. | B60Q 1/085 |
| 9,436,880 | B2 | * | 9/2016 | Bos | ......................... | B60Q 9/008 |
| 9,803,822 | B1 | * | 10/2017 | Salter | ...................... | F21S 41/13 |
| 9,946,734 | B2 | * | 4/2018 | Ekin | ......................... | G08G 1/04 |
| 10,222,529 | B1 | * | 3/2019 | Cohoon | ................. | G02B 6/001 |

(Continued)

FOREIGN PATENT DOCUMENTS

| | | | |
|---|---|---|---|
| JP | 2012-76714 A | 4/2012 | |
| WO | WO-2023244693 A1 * | 12/2023 | ............. B60K 35/81 |

*Primary Examiner* — Srinivas Sathiraju

(74) *Attorney, Agent, or Firm* — NSIP Law

(57) ABSTRACT

A lamp system of a mobile body is disclosed. The system includes an optical module positioned on the mobile body, and a processor to receive a relative position coordinate value of a following mobile body, control the optical module based on the received relative position coordinate value of the following mobile body, and control light quantity emitted by the optical module based on the received relative position coordinate value in response to the following mobile body being within a predetermined range area relative to the mobile body.

18 Claims, 9 Drawing Sheets

(56)                References Cited

U.S. PATENT DOCUMENTS

| | | | | |
|---|---|---|---|---|
| 10,281,113 | B1* | 5/2019 | Salter | B60R 19/483 |
| 10,698,114 | B2* | 6/2020 | Keilaf | G05D 1/024 |
| 10,920,950 | B1* | 2/2021 | Glickman | B60Q 3/30 |
| 11,034,292 | B2* | 6/2021 | Glickman | B60R 11/0229 |
| 11,332,066 | B2* | 5/2022 | Pecher | F21S 43/14 |
| 11,377,022 | B2* | 7/2022 | Pomish | B60K 35/22 |
| 11,441,751 | B2* | 9/2022 | Ahn | F21S 43/26 |
| 11,485,278 | B2* | 11/2022 | Kulkarni | G01S 13/58 |
| 11,592,049 | B2* | 2/2023 | Charpentier | F16B 21/09 |
| 11,726,184 | B2* | 8/2023 | Ferreira | G01S 17/894 |
| | | | | 356/4.01 |
| 11,760,254 | B2* | 9/2023 | Kulkarni | G01S 15/58 |
| | | | | 315/82 |
| 2004/0056779 | A1* | 3/2004 | Rast | B63B 22/16 |
| | | | | 340/985 |
| 2011/0221350 | A1* | 9/2011 | Staab | H05B 47/198 |
| | | | | 315/154 |
| 2013/0201335 | A1* | 8/2013 | Heinemann | G06T 11/10 |
| | | | | 348/148 |
| 2014/0177247 | A1* | 6/2014 | Roeckl | F21S 43/27 |
| | | | | 362/509 |
| 2014/0218946 | A1* | 8/2014 | Fritz | B60Q 1/04 |
| | | | | 362/465 |
| 2015/0078022 | A1* | 3/2015 | Bauer | F21S 41/176 |
| | | | | 362/510 |
| 2016/0200161 | A1* | 7/2016 | Van Den Bossche | G01B 11/24 |
| | | | | 250/206 |
| 2017/0217359 | A1* | 8/2017 | Huettner | B60S 1/0818 |
| 2018/0136337 | A1* | 5/2018 | Zohar | G01S 7/4812 |
| 2018/0143304 | A1* | 5/2018 | Rosenzweig | G05D 1/024 |
| 2018/0143306 | A1* | 5/2018 | Elooz | G01S 7/4876 |
| 2018/0143324 | A1* | 5/2018 | Keilaf | G02B 26/10 |
| 2019/0073909 | A1* | 3/2019 | Neubecker | B60Q 1/508 |
| 2019/0198732 | A1* | 6/2019 | Shimizu | H10H 20/855 |
| 2019/0212450 | A1* | 7/2019 | Steinberg | G01S 7/497 |
| 2019/0271769 | A1* | 9/2019 | Raly | G01S 7/4812 |
| 2020/0258320 | A1* | 8/2020 | Lu | G07C 5/008 |
| 2020/0284883 | A1* | 9/2020 | Ferreira | G01S 7/4815 |
| 2021/0146823 | A1* | 5/2021 | Pomish | B60Q 9/00 |
| 2021/0229596 | A1* | 7/2021 | Pecher | B60Q 1/2603 |
| 2021/0296530 | A1* | 9/2021 | Bailey | H10H 20/855 |
| 2021/0365035 | A1* | 11/2021 | Verbrugh | G05D 1/0234 |
| 2021/0370831 | A1* | 12/2021 | Kim | B60R 1/24 |
| 2021/0370928 | A1* | 12/2021 | Lee | G06V 20/58 |
| 2021/0380123 | A1* | 12/2021 | Lim | B60K 31/18 |
| 2022/0050203 | A1* | 2/2022 | David Keilaf | G05D 1/024 |
| 2022/0080878 | A1* | 3/2022 | Kim | B60W 30/08 |
| 2022/0238019 | A1* | 7/2022 | Tsuda | G06Q 40/08 |
| 2022/0396266 | A1* | 12/2022 | Kim | B60W 30/162 |
| 2023/0101872 | A1* | 3/2023 | Kwon | B60W 30/095 |
| | | | | 701/26 |
| 2023/0221451 | A1* | 7/2023 | Choi | G01S 7/4808 |
| | | | | 701/445 |
| 2023/0264626 | A1* | 8/2023 | Hélot | B60Q 1/0023 |
| | | | | 315/82 |
| 2023/0368543 | A1* | 11/2023 | Lee | G06V 20/588 |
| 2023/0410725 | A1* | 12/2023 | Moran | G06F 3/0412 |
| 2023/0410726 | A1* | 12/2023 | Moran | G06F 3/0412 |
| 2024/0103166 | A1* | 3/2024 | Ichiki | G01S 17/58 |
| 2024/0270238 | A1* | 8/2024 | Min | B60W 30/0956 |
| 2024/0349411 | A1* | 10/2024 | Heo | B60Q 1/2603 |
| 2024/0401766 | A1* | 12/2024 | Ko | B60Q 1/0017 |

* cited by examiner

LAMP SYSTEM OF MOBILE BODY AND CONTROL METHOD THEREOF

CROSS-REFERENCE TO RELATED APPLICATION(S)

This application claims the benefit under 35 U.S.C. § 119 to Korean Patent Application No. 10-2023-0048021, filed on Apr. 12, 2023, in the Korean Intellectual Property Office, the disclosure of which is incorporated by reference for all purposes.

1. FIELD

The following disclosure relates to a lamp system for a mobile body and a control method thereof, and more particularly, to a rear lamp system for the rear of a mobile body that may adjust a light quantity based on a position of a following vehicle, and a control method thereof.

2. DESCRIPTION OF RELATED ART

A rear lamp refers to a lighting device installed at the rear of a vehicle such as a car, a motorcycle, and a truck. The rear lamp is a device serving to illuminate the rear of the vehicle while driving and is essential to increase driving safety. The rear lamp may be used to visually notify other drivers and pedestrians of the position and movement of the vehicle while driving. In general, the rear lamp may include a fog light, a brake light, a turn signal light, etc.

Meanwhile, an adaptive headlight or "adaptive lighting system" may recognize movement of an obstacle or another vehicle in front of the vehicle while driving, and adjust a light quantity to support a vehicle driver to drive the vehicle more safely and comfortably. Adaptive headlight technology may use a camera, a radar, a sensor, or the like to detect a surrounding situation, and automatically adjust a direction of a headlight based thereon. For example, this technology may provide better visibility by temporarily lowering a beam of the headlamp to reduce glare when an approaching vehicle is detected, or automatically turning the headlamp in a curve direction when the vehicle turns a curve. In addition, the adaptive lighting system is similar to the adaptive headlight. However, the system may function to automatically control the lighting device such as the brake light, the turn signal light, and an interior lighting in addition to the headlamp. For example, the system may display a surrounding environment more brightly by warning a driver of a following vehicle by strengthening the light quantity of the brake light when suddenly stopping the vehicle or strengthening the interior lighting when parking the vehicle.

However, unlike the headlight above, the rear lamp could only serve to illuminate the rear at night, thereby preventing a collision of a host vehicle with the following vehicle, informing that the host vehicle is moving backward, or the like. In addition, the conventional rear lamp may control powers of left and right lamps to be the same, thus having poor power consumption. In addition, the conventional rear lamp may provide a constant light quantity even when a distance between the two vehicles is changed. Therefore, the lamp may cause an accident by causing stress and glare to the following vehicle when the two vehicles are close to each other, and making it difficult to recognize the host vehicle and secure a safe distance between the vehicles when the two vehicles are moved away from each other.

Related Art may include Japanese Patent No. 5629174 entitled "REAR LIGHTING SYSTEM FOR VEHICLE," and published on Apr. 19, 2012.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a lamp system of a mobile body includes: an optical module positioned on the mobile body; and a processor to: receive a relative position coordinate value of a following mobile body; control the optical module based on the received relative position coordinate value of the following mobile body; and control light quantity emitted by the optical module based on the received relative position coordinate value in response to the following mobile body being within a predetermined range area relative to the mobile body.

The processor may further: determine a position of the following mobile body based on an X-axis relative position coordinate value in a width direction of the mobile body; determine that the following mobile body is positioned directly behind the mobile body in response to the following mobile body being positioned in a first area which is a predetermined range area centered on the mobile body; determine that the following mobile body is positioned at the left rear of the mobile body in response to the following mobile body being positioned in a second area which is a predetermined range area positioned on the left of the first area; and determine that the following mobile body is positioned at the right rear of the mobile body in response to the at least one following mobile body being positioned in a third area which is a predetermined range area positioned on the right of the first area.

The at least one optical module may include a plurality of optical modules that are positioned at one or more sides of the mobile body, wherein processor: determines a position of the at least one following mobile body based on a Y-axis relative position coordinate value in a length direction of the mobile body; and controls the light quantity emitted by the plurality of optical modules to be weaker based on the Y-axis relative position coordinate value in response to the at least one following mobile body being positioned directly behind the mobile body.

The processor may further calculate a final relative position coordinate value based on the X-axis and Y-axis relative position coordinate values, and control the light quantity of the at least one optical module to be lower based on a final relative position coordinate value in response to the at least one following mobile body being positioned at the left rear or the right rear of the mobile body.

The processor may further control the light quantity of the at least one optical module to gradually recover to a predetermined reference value when the Y-axis relative position coordinate value of the at least one following mobile body is changed to be a threshold value or less.

The processor may further increase light quantity of an area excluding a predetermined range among the light quantity of the at least one optical module when the at least one following mobile body and another following mobile body are not positioned in any of the first to third areas while being positioned at the left or right rear of the mobile body.

The processor may further calculate a final relative position coordinate value based on the X-axis and Y-axis relative position coordinate values, and control the light quantity of the at least one optical module to be weaker based on the final relative position coordinate value in response to the other following mobile body being positioned in the second area or the third area.

The at least one optical module may include a plurality of optical modules that are positioned at one or more sides of the mobile body, and the processor may further control the light quantity of the predetermined range area to be increased among the light quantity of the plurality of optical modules in response to another following mobile body, which is different from the at least one following mobile body, not being positioned in the first area while being positioned directly behind the mobile body.

The at least one optical module may include a plurality of optical modules that are positioned at various sides of the mobile body.

The processor may further control the light quantity emitted by the at least one optical module by adjusting at least one of light intensity, light color, light flicker, or any combination thereof, based on the received relative position coordinate value in response to the other mobile body being within the predetermined range from the mobile body.

The processor may control the light quantity emitted by the at least one optical module based on the distance between the mobile body and the at least one following mobile body.

The lamp system may further include at least one sensor configured to detect the relative position of the at least one following mobile body and transmit the detected relative position to the processor, and the at least one sensor or the optical module may be positioned at at least one of a rear of the mobile body, a front of the mobile body, a left side of the mobile body, or a right side of the mobile body, a top of the mobile body, or a bottom of the mobile body, or any combination thereof.

In another aspect of the disclosure, a processor-implemented control method of a lamp system for a mobile body which includes at least one optical module, includes: receiving a relative position coordinate value of at least one following mobile body; controlling the at least one optical module based on the received relative position coordinate value; and controlling light quantity of the at least one optical module based on the at least one relative position coordinate value in response to the following mobile body being within a predetermined range area relative to the mobile body.

The method may further include: determining a position of the following mobile body based on an X-axis relative position coordinate value; determining that the following mobile body is positioned directly behind the mobile body when the following mobile body is positioned in a first area which is a predetermined range area centered on the mobile body; determining that the following mobile body is positioned at the left rear of the mobile body when the following mobile body is positioned in a second area which is a predetermined range area positioned on the left of the first area; and determining that the following mobile body positioned at the right rear of the mobile body when the following mobile body is positioned in a third area which is a predetermined range area positioned on the right of the first area.

The method may further include: controlling the light quantity of the at least one optical module to be weaker based on a Y-axis relative position coordinate value in response to the following mobile body being positioned directly behind the mobile body; and increasing light quantity of an area excluding a predetermined range among the light quantity of the at least one optical module in response to the following mobile body and another following mobile body not being positioned in any of the first area, the second area, and the third area while being positioned at the left or right rear of the mobile body; calculating a final relative position coordinate value based on the X-axis and Y-axis relative position coordinate values; and controlling the light quantity of the at least one optical module to be weaker based on the final relative position coordinate value in response to another following mobile body being positioned in the second area or the third area.

The method may further include calculating a final relative position coordinate value based on the X-axis and Y-axis relative position coordinate values, and controlling the light quantity of the at least one optical module to be weaker based on the final relative position coordinate value in response to the following mobile body being positioned at the left rear or the right rear of the mobile body.

The method may further include controlling the light quantity of the at least one optical module to be gradually recovered to a predetermined reference value in response to the Y-axis relative position coordinate value of the following mobile body being changed to be a threshold value or less.

The at least one optical module may include a plurality of optical modules, and the method may further include controlling the light quantity of the predetermined range area to be increased among the light quantity of the plurality of optical modules in response to another following mobile body, which is different from the following mobile body, not being positioned in the first area while being positioned directly behind the mobile body.

DETAILED DESCRIPTION

In order to describe the present disclosure, operational advantages of the present disclosure, and objects accomplished by embodiments of the present disclosure, the embodiments of the present disclosure are hereinafter exemplified and described with reference to the accompanying drawings.

First, terms used in this application are used only to describe specific embodiments rather than limiting the present disclosure, and a term of a singular number may include its plural number unless explicitly indicated otherwise in the context. In addition, it is to be understood that a term "include," "have", or the like used in this application specifies the existence of features, numerals, steps, operations, components, parts, or combinations thereof, which are mentioned in the specification, and does not preclude the existence or addition of one or more other features, numerals, steps, operations, components, parts, or combinations thereof.

When it is decided that the detailed description of the known configuration or function related to the present disclosure may obscure the gist of the present disclosure, the detailed description thereof will be omitted.

Figure 1:
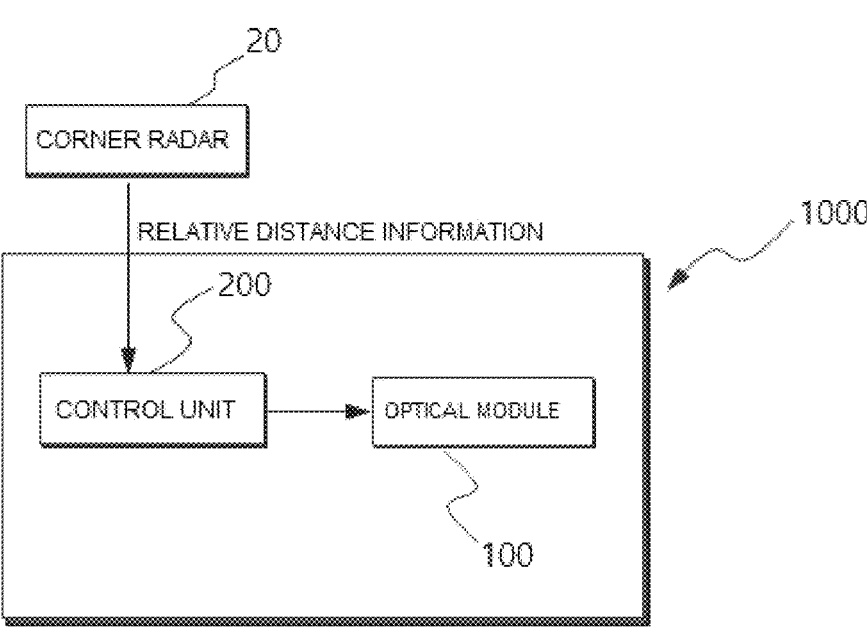
FIG. 1 is a schematic view showing a rear lamp system according to the present disclosure.

FIG. 1 is a schematic view showing a rear lamp system according to the present disclosure.

As shown in FIG. 1, a rear lamp system 1000 according to the present disclosure may include an optical module 100 (e.g., a lamp) and a control unit 200 (e.g., at least one processor). The rear lamp system 1000 according to the present disclosure may be positioned on a mobile body 10, and the plurality of optical modules 100 may be positioned on both sides of the mobile body 10.

The control unit 200 may control the optical module 100 based on a relative position coordinate value of at least one following mobile body 30 that is received from the outside.

In detail, the control unit 200 may receive at least one relative position coordinate value from the outside, and determine a position of the following mobile body 30 based thereon. In more detail, the control unit 200 may determine whether the following mobile body 30 enters a predetermined range area, and control light quantity of the optical module 100 based on a determination result.

The control unit 200 may receive the relative position coordinate value from a corner radar 20 (i.e., a sensor) positioned on the mobile body 10. The control unit 200 may receive the relative position coordinate value from the existing corner radar 20 to prevent an increase in the number of parts positioned in the mobile body 10, thus preventing an increase in cost.

Meanwhile, the control unit 200 may receive the relative position coordinate value, determine the position of the following mobile body 30, and determine the position of the following mobile body 30 based on an X-axis relative position coordinate value included in the above relative position coordinate value.

Hereinafter, the description describes an operation of the rear lamp system 1000 based on a situation according to the present disclosure in detail with reference to FIGS. 2 through 8.

Figure 2:
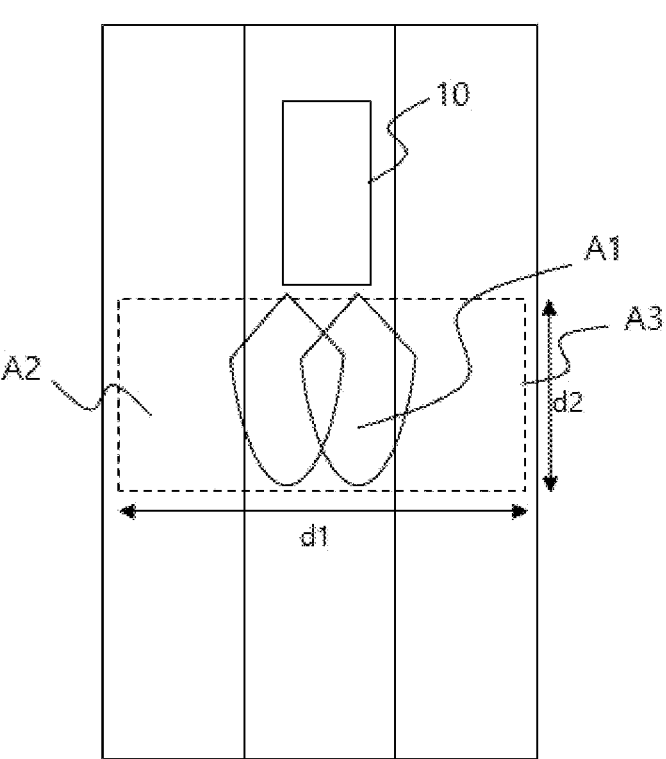
FIG. 2 is a schematic view showing an operation of the rear lamp system according to Example 1 of the present disclosure.

FIG. 2 is a schematic view showing an operation of the rear lamp system according to Example 1 of the present disclosure.

Figure 3:
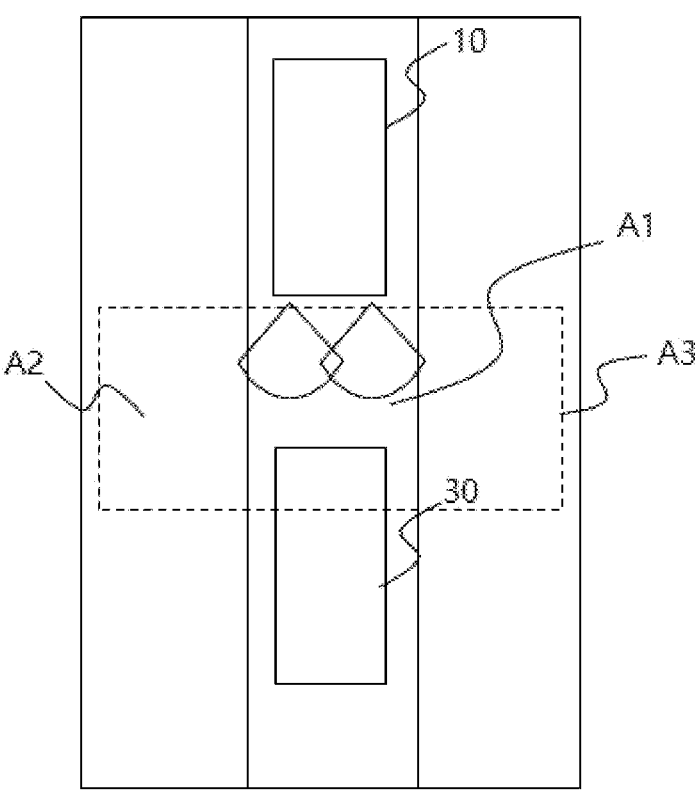
FIG. 3 is a schematic view showing an operation of the rear lamp system according to Example 2 of the present disclosure.

FIG. 3 is a schematic view showing an operation of the rear lamp system according to Example 2 of the present disclosure.

Figure 4:
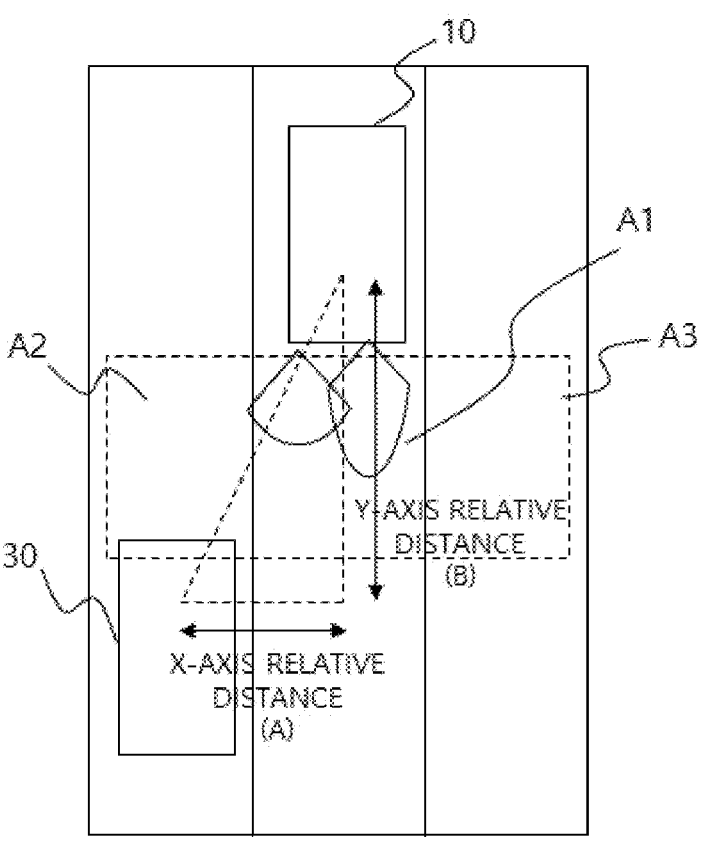
FIG. 4 is a schematic view showing an operation of the rear lamp system according to Example 3 of the present disclosure.

FIG. 4 is a schematic view showing an operation of the rear lamp system according to Example 3 of the present disclosure.

As shown in FIG. 2, the predetermined range area may be divided into first to third areas A1 to A3. Here, the predetermined range area may have a horizontal length d1 of approximately 10 m and a vertical length d2 of approximately 6 m.

The control unit 200 may determine that the following mobile body 30 is positioned directly behind the mobile body 10 and approaches the mobile body 10 when the following mobile body 30 is positioned in the first area A1, which is a predetermined range area centered on the mobile body 10. In addition, the control unit 200 may determine that the following mobile body 30 is positioned at the left rear of the mobile body 10 and approaches the mobile body 10 when the following mobile body 30 is positioned in the second area A2, which is a predetermined range area positioned on the left of the first area A1 based on a direction in which the mobile body 10 is moved. On the other hand, the control unit 200 may determine that the following mobile body 30 is positioned at the right rear of the mobile body 10 and approaches the mobile body 10 when the following mobile body 30 is positioned in the third area A3, which is a predetermined range area positioned on the right of the first area A1 based on the direction in which the mobile body 10 is moved.

As shown in FIG. 2, the plurality of optical modules 100 may emit light with 100% of the light quantity based on an existing regulation when the following mobile body 30 does not exist within the predetermined range.

Meanwhile, as shown in FIG. 3, the control unit 200 may control light quantity of the plurality of optical modules 100 to be lower when determining that the following mobile body 30 exists within the predetermined range and is positioned directly behind the mobile body 10. Here, the light quantity may be controlled in proportion to a Y-axis relative position coordinate value, and maintained of 80% or more based on the light quantity regulation.

FIG. 4 shows a case where the following mobile body 30 approaches the mobile body 10 from the side rear. Referring to FIG. 4, it may be seen that the following mobile body 30 approaches the mobile body 10 from the left rear. The control unit 200 may control the light quantity of the left optical module 110 among the plurality of optical modules 100 to be lower when determining that the following mobile body 30 approaches the mobile body 10 from the left rear.

In detail, the control unit 200 may calculate the final relative position coordinate value based on the X-axis and Y-axis relative position coordinate values, and control the light quantity of the optical module based thereon.

In more detail, the final relative position coordinate value may be $\sqrt{A^2+B^2}$ when an X-axis relative distance is A and a Y-axis relative distance is B.

Contrary to FIG. 4, the control unit 200 may control the light quantity of the right optical module 120 among the plurality of optical modules 100 to be lower when the following mobile body 30 approaches the mobile body 10 from the right rear. A control method of the light quantity is the same as described above (i.e., in the case of the left rear optical module), and the description thus omits descriptions thereof.

Figure 5:
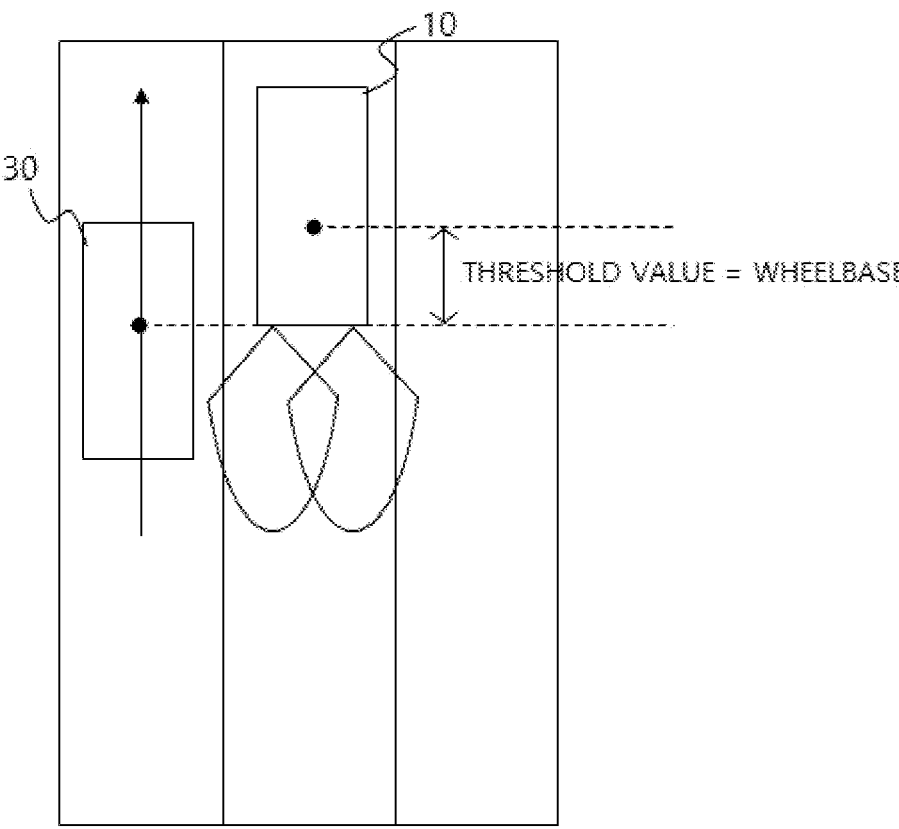
FIG. 5 is a schematic view showing an operation of the rear lamp system according to Example 4 of the present disclosure.

FIG. 5 is a schematic view showing an operation of the rear lamp system according to Example 4 of the present disclosure.

FIG. 5 shows a case where the following mobile body 30 approaches the mobile body 10 from the side rear and overtakes the mobile body 10. Here, the control unit 200 may control the existing lower light quantity of the left or right optical module 110 or 120 to be gradually recovered to a predetermined reference value when the Y-axis relative position coordinate value of the following mobile body 30 that is received by the control unit 200 is a threshold value or less.

In detail, the threshold value may be set based on a wheelbase of the mobile body 10, and may vary depending on a vehicle type. The wheelbase refers to a length from the central axis of a front wheel to the central axis of a rear wheel.

The light quantity here may be different from the light quantity of an existing brake or the like in being gradually recovered during the overtake while being maintained between 80% and 100% based on the regulation.

Next, the description describes a case where a plurality of mobile bodies 30 and 40 exist in the rear of the mobile body 10.

Figure 6:
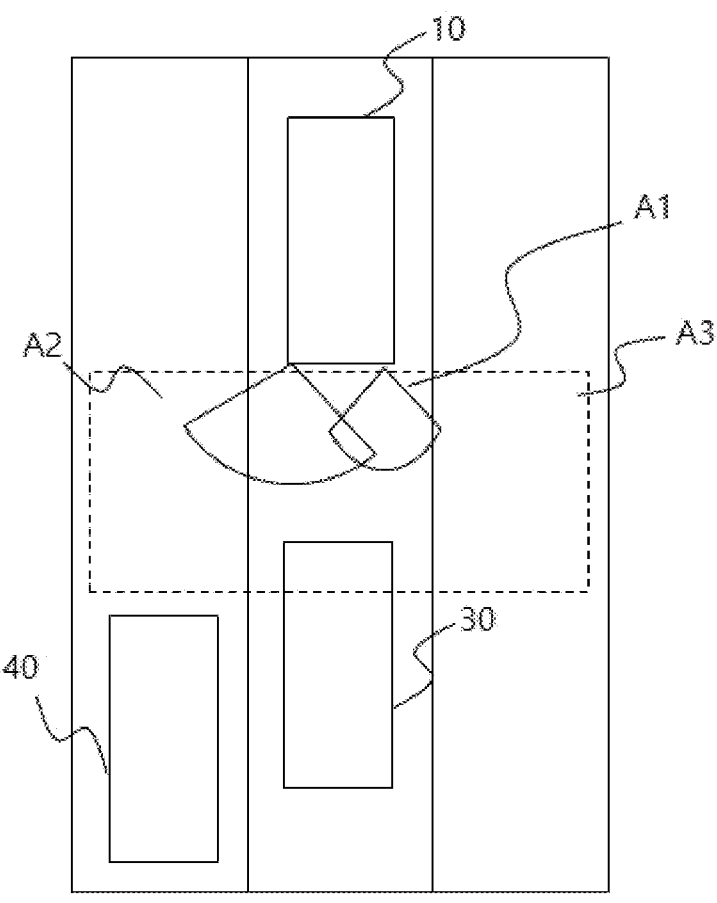
FIG. 6 is a schematic view showing an operation of the rear lamp system according to Example 5 of the present disclosure.

FIG. 6 is a schematic view showing an operation of the rear lamp system according to Example 5 of the present disclosure.

Figure 7:
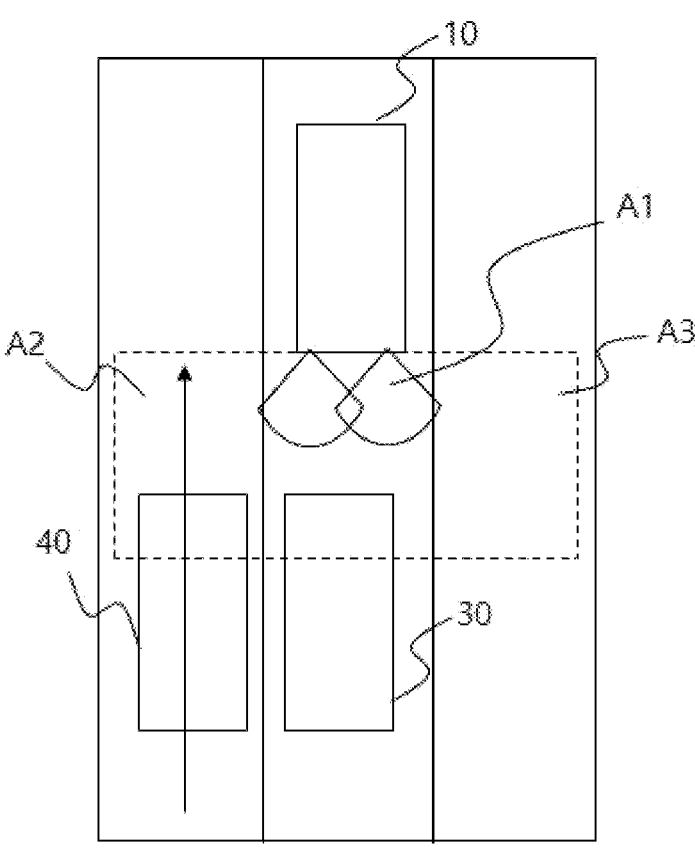
FIG. 7 is a schematic view showing an operation of the rear lamp system according to Example 6 of the present disclosure.

FIG. 7 is a schematic view showing an operation of the rear lamp system according to Example 6 of the present disclosure.

Figure 8:
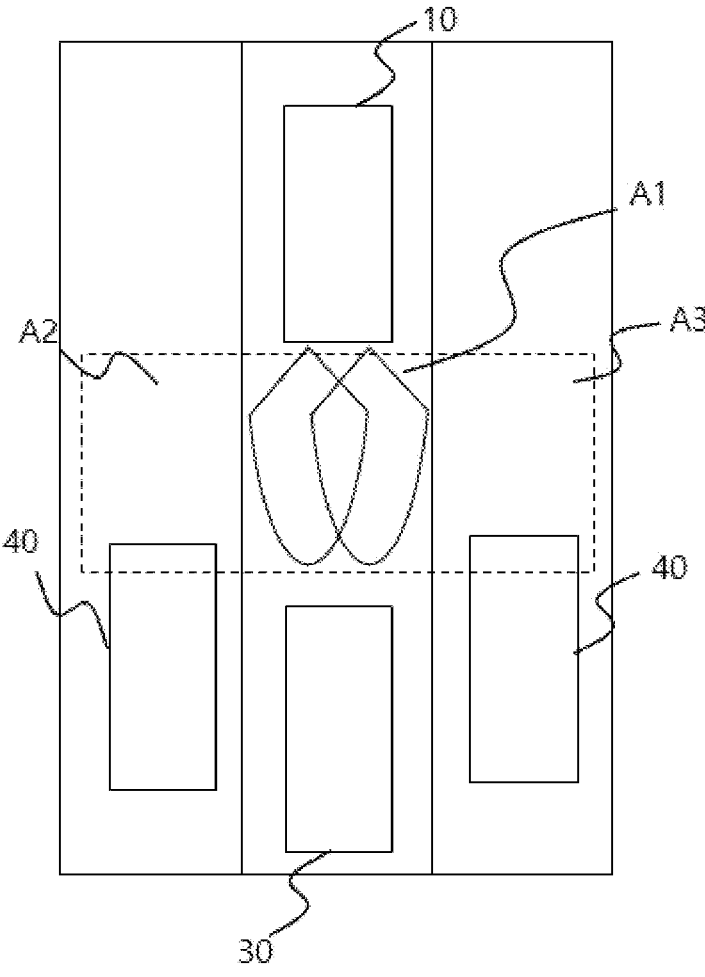
FIG. 8 is a schematic view showing an operation of the rear lamp system according to Example 7 of the present disclosure.

FIG. 8 is a schematic view showing an operation of the rear lamp system according to Example 7 of the present disclosure.

As shown in FIG. 6, the control unit 200 may control the light quantity of the left or right optical module 110 or 120 when the following mobile body 30 exists directly behind the mobile body 10, and another following mobile body 40 appears at the left or right rear of the mobile body 10 after a predetermined time.

In detail, another following mobile body 40 may not be included in any of the first to third areas A1 to A3 while existing at the left or right rear of the mobile body 10. In this case, the control unit 200 may increase the light quantity of the left or right optical module that is lower for the following mobile body 30 among the light quantity of the plurality of optical modules 100, that is, the light quantity of the optical module 110 or 120 in a direction in which another following mobile body 40 is positioned. In more detail, the control unit 200 may only increase light quantity of an area excluding a predetermined range among the light quantity of the left or right optical module 110 or 120. Here, the predetermined range refers to a predetermined range from the center of the left or right optical module 110 or 120, and the control unit 200 may increase the light quantity of a peripheral area, which is the area excluding the predetermined range. In this way, the control unit 200 may help another following mobile body 40 to identify a position of the mobile body 10 which serves as a reference for another mobile body 40.

In addition, FIG. 7 shows a case where the following mobile body 30 exists directly behind the mobile body 10, the following mobile body 40 appears at the left or right rear of the mobile body 10 after the predetermined time, and the following mobile body 40 enters the predetermined range. In other words, in this case, the following mobile body 30 may exist in the first area A1, and another following mobile body 40 may exist in the second area A2 or the third area A3. In this case, the control unit 200 may calculate the final relative position coordinate value based on the X-axis and Y-axis relative position coordinate values, and control the light quantity of the optical module 110 or 120 based thereon.

In detail, the control unit 200 may lower the light quantity of the optical module 110 or 120, the light quantity being increased for another following mobile body 40 that appears at the side rear without entering any of the first to third areas A1 to A3, in the corresponding direction among the left and right optical modules based on a final relative distance when the following mobile body 40 approaches the mobile body 10 after the predetermined time and enters the second area A2 or the third area A3.

In more detail, the final relative position coordinate value may be $\sqrt{A^2+B^2}$ when the X-axis relative distance is A and the Y-axis relative distance is B.

Meanwhile, FIG. 8 shows a case where the following mobile body 30 exists at the left or right of the mobile body 10, and another following mobile body 40 appears directly behind the mobile body 10 after the predetermined time.

In other words, in this case, another following mobile body 40 may fail to enter the first area A1 even though another following mobile body 40 is positioned directly behind the mobile body 10.

In this case, the control unit 200 may control the light quantity of the plurality of optical modules 100 to be increased to help another following mobile body 40 to identify the position of the mobile body 10.

In detail, the control unit 200 may control the light quantity of the left or right optical module 110 or 120 for the light quantity of the left or right optical module 110 or 120 that is lower in order for the following mobile body 30 positioned in the second area A2 or the third area A3 to be increased.

In more detail, the control unit 200 may only increase the light quantity of the predetermined area for each light quantity of the left or right optical module 110 or 120, thereby controlling the light quantity in the center to be increased based on the overall light quantity.

In addition, a standard for changing a light pattern of the rear lamp system 1000 according to the present disclosure when another following mobile body 40 appears may be a "driving speed value of—15 (m)" while driving on a regular road, and a "driving speed value of (m)" when driving at 80 km/h or higher or driving on a high-speed road, based on a safety distance. This standard may depend on a road condition and a weather condition.

Figure 9:
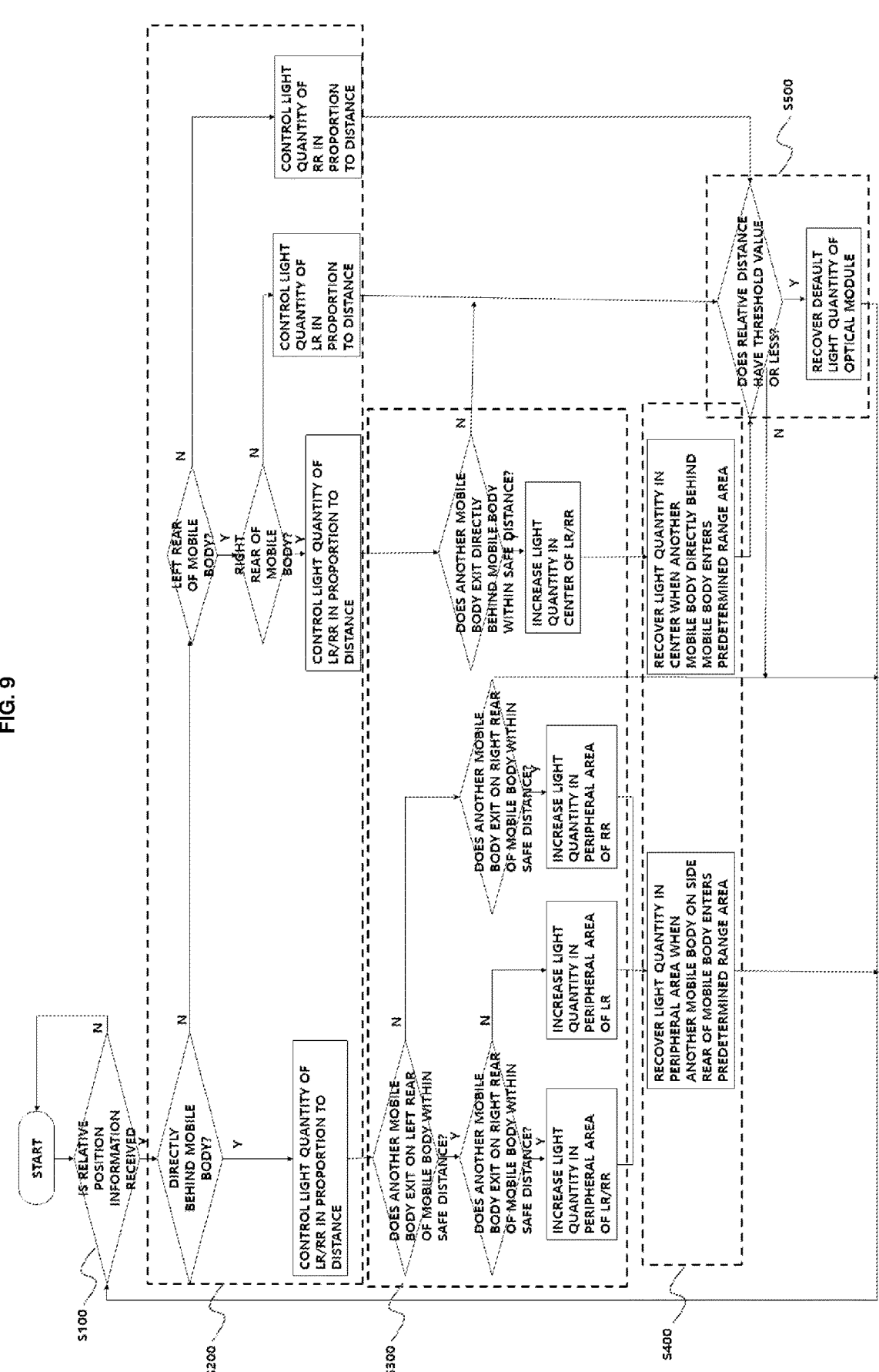
FIG. 9 is a flowchart showing a control method of a rear lamp system according to the present disclosure.

FIG. 9 is a flowchart showing a control method of a rear lamp system according to the present disclosure.

As shown in FIG. 9, provided is a control method of a rear lamp system 1000 positioned on a mobile body 10 and including a plurality of optical modules 100 according to the present disclosure, the method including: a step S100 of receiving, by the control unit 200, a relative position coordinate value of at least one following mobile body 30 from the outside; and a step S200 of controlling, by the control unit 200, the plurality of optical modules 100 based on the at least one relative position coordinate value. Here, in the step S200, the control unit 200 may determine whether a following mobile body 30 enters a predetermined range area, and may control light quantity of the plurality of optical modules 100 based on a determination result.

Meanwhile, in the step S200, the control unit 200 may determine a position of the following mobile body 30 based on an X-axis relative position coordinate value included in the relative position coordinate value.

In detail, the control unit 200 may determine that the following mobile body 30 is positioned directly behind a mobile body 10 and approaches the mobile body 10 when the following mobile body 30 is positioned in a first area A1, which is a predetermined range area centered on the mobile body 10. In addition, the control unit 200 may determine that the following mobile body 30 is positioned at the left rear of the mobile body 10 and approaches the mobile body 10 when the following mobile body 30 is positioned in a second area A2, which is a predetermined range area positioned on the left of the first area A1 based on a direction in which the mobile body 10 is moved. On the other hand, the control unit 200 may determine that the following mobile body 30 is positioned at the right rear of the mobile body 10 and approaches the mobile body 10 when the following mobile body 30 is positioned in a third area A3, which is a predetermined range area positioned on the right of the first area A1 based on the direction in which the mobile body 10 is moved.

In more detail, in the step S200, the control unit 200 may control light quantity of the plurality of optical modules 100 to be lower when determining that the following mobile body 30 exists within the predetermined range and is positioned directly behind the mobile body 10. Here, the light quantity may be controlled in proportion to a Y-axis relative position coordinate value, and maintained at 80% or more based on a light quantity regulation.

For another example, in the step S200, the control unit 200 may control the light quantity of the left optical module 110 among the plurality of optical modules 100 to be lower when determining that the following mobile body 30 approaches the mobile body 10 from the left rear.

In detail, the control unit 200 may calculate a final relative position coordinate value based on the X-axis and Y-axis relative position coordinate values, and control the light quantity of the optical module 110 based thereon.

In more detail, the final relative position coordinate value may be $\sqrt{A^2+B^2}$ when an X-axis relative distance is A and a Y-axis relative distance is B.

In addition, in the step S200, the control unit 200 may control the light quantity of the right optical module 120 among the plurality of optical modules 100 to be lower when the following mobile body 30 approaches the mobile body 10 from the right rear. A control method of the light quantity is the same as described above (i.e., in the case of the left rear optical module), and the description thus omits descriptions thereof.

Further, in a step S400, if the following mobile body 30 approaches the mobile body 10 from the side rear and overtakes the mobile body 10, the control unit 200 may control the existing lower light quantity of the left or right optical module 110 or 120 to be gradually recovered to a predetermined reference value when the Y-axis relative position coordinate value of the following mobile body 30 that is received by the control unit 200 is a threshold value or less.

Meanwhile, in a step S300, the control unit 200 may control the light quantity of the left or right optical module 110 or 120 when the following mobile body 30 exists directly behind the mobile body 10, and another following mobile body 40 appears at the left or right rear of the mobile body 10 after a predetermined time.

In detail, another following mobile body 40 may not be included in any of the first to third areas A1 to A3 while existing at the left or right rear of the optical module. In this case, the control unit 200 may increase the light quantity of the optical module 110 or 120 in a direction in which another following mobile body 40 is positioned, that is, the light quantity of the left or right optical module that is lower for the following mobile body 30 among the light quantity of the plurality of optical modules 100.

In more detail, the control unit 200 may only increase the light quantity of an area excluding a predetermined range among the light quantity of the left or right optical module 110 or 120. Here, the predetermined range refers to a predetermined range from the center of the left or right optical module 110 or 120, and the control unit 200 may increase the light quantity of a peripheral area, which is the area excluding the predetermined range. In this way, the control unit 200 may help another following mobile body 40 to identify a position of the mobile body 10 which serves as a reference for another mobile body 40.

In addition, the following mobile body 30 may exist directly behind the mobile body 10, the following mobile body 40 may appear at the left or right rear of the mobile body 10 after the predetermined time, and the following mobile body 40 may enter the predetermined range. In other words, in the step S400, the following mobile body 30 may exist in the first area A1, and another following mobile body 40 may exist in the second area A2 or the third area A3. In this case, the control unit 200 may calculate the final relative position coordinate value based on the X-axis and Y-axis relative position coordinate values, and control the light quantity of the optical module 110 or 120 based thereon.

In detail, the control unit 200 may lower the light quantity of the optical module 110 or 120, the light quantity being increased for another following mobile body 40 that appears at the side rear without entering any of the first to third areas A1 to A3, in the corresponding direction among the left and right optical modules based on a final relative distance when the following mobile body 40 approaches the host vehicle after the predetermined time and enters the second area A2 or the third area A3.

In more detail, the final relative position coordinate value may be $\sqrt{A^2+B^2}$ when the X-axis relative distance is A and the Y-axis relative distance is B.

Meanwhile, the following mobile body 30 may exist at the left or right of the mobile body 10, and another following mobile body 40 may appear directly behind the mobile body 10 after the predetermined time.

In other words, another following mobile body 40 may fail to enter the first area A1 even though another following mobile body 40 is positioned directly behind the mobile body 10.

In the step S300, the control unit 200 may control the light quantity of the plurality of optical modules 100 to be increased to help another following mobile body 40 to identify the position of the mobile body 10.

In detail, the control unit 200 may control the light quantity of the left or right optical module 110 or 120 for the light quantity of the left or right optical module 110 or 120 that is lower in order for the following mobile body 30 positioned in the second area A2 or the third area A3 to be increased.

In more detail, the control unit 200 may only increase the light quantity of the predetermined area for each light quantity of the left or right optical module 110 or 120, thereby controlling the light quantity in the center to be increased based on the overall light quantity.

As set forth above, the rear lamp system and the control method thereof according to the various embodiments of the present disclosure as described above may significantly improve the power consumption performance during the traffic jam time.

In addition, the system and the method may utilize the relative position coordinate values of the existing corner radar to prevent the increase in the number of parts, thus preventing the increase in the cost.

In addition, the system and the method may implement the low power consumption and easily inform the vehicle in the far field of the position of the host vehicle by controlling the power of the left and right lamps to be different when another vehicle approaches the host vehicle from its side or rear.

An embodiment of the present disclosure is directed to providing a rear lamp system for the rear of a mobile body which may reduce glare and improve driving safety by adjusting a light quantity of a rear lamp based on a distance between vehicles, and a control method thereof.

Although the embodiments of the present disclosure are described as above, the embodiments disclosed in the present disclosure are provided not to limit the spirit of the present disclosure but to fully describe the present disclosure. Therefore, the spirit of the present disclosure may include not only each disclosed embodiment but also a combination of the disclosed embodiments. Further, the scope of the present disclosure is not limited by these embodiments. In addition, it is apparent to those skilled in the art to which the present disclosure pertains that variations and modifications could be made without departing from the spirit and scope of the appended claims, and all such appropriate variations and modifications should be considered as falling within the scope of the present disclosure as equivalents.

What is claimed is:

1. A lamp system of a mobile body, the system comprising:

an optical module positioned on the mobile body; and
a processor configured to:
receive, from a sensor in the mobile body, a relative position coordinate value of a following mobile body that is following the mobile body, relative to the sensor;
control the optical module based on the received relative position coordinate value of the following mobile body; and
in response to the following mobile body being within a predetermined range area relative to the mobile body, control the optical module to emit light quantity based on the received relative position coordinate value of the following mobile body,
wherein the optical module is positioned at a rear of the mobile body and visible from the following mobile body.

2. The system of claim 1, wherein the processor is further configured to:

determine a position of the following mobile body based on an X-axis relative position coordinate value in a width direction of the mobile body;
determine that the following mobile body is positioned directly behind the mobile body in response to the following mobile body being positioned in a first area which is a predetermined range area centered on the mobile body;
determine that the following mobile body is positioned at the left rear of the mobile body in response to the following mobile body being positioned in a second area which is a predetermined range area positioned on the left of the first area; and
determine that the following mobile body is positioned at the right rear of the mobile body in response to the following mobile body being positioned in a third area which is a predetermined range area positioned on the right of the first area.

3. The system of claim 2, wherein the optical module comprises a plurality of optical modules that are positioned at one or more sides of the mobile body, wherein processor is further configured to:
determine a position of the following mobile body based on a Y-axis relative position coordinate value in a length direction of the mobile body; and
control the light quantity emitted by the plurality of optical modules to be weaker based on the Y-axis relative position coordinate value in response to the following mobile body being positioned directly behind the mobile body.

4. The system of claim 3, wherein the processor is further configured to increase light quantity of an area excluding a predetermined range among the light quantity of the optical module when the following mobile body and another following mobile body are not positioned in any of the first to third areas while being positioned at the left or right rear of the mobile body.

5. The system of claim 4, wherein the processor is further configured to:

calculate a final relative position coordinate value based on the X-axis and Y-axis relative position coordinate values; and
control the light quantity of the optical module to be weaker based on the final relative position coordinate value in response to the other following mobile body being positioned in the second area or the third area.

6. The system of claim 2, wherein the processor is further configured to:

calculate a final relative position coordinate value based on the X-axis and Y-axis relative position coordinate values; and
control the light quantity of the optical module to be lower based on a final relative position coordinate value in response to the following mobile body being positioned at the left rear or the right rear of the mobile body.

7. The system of claim 6, wherein processor is further configured to control the light quantity of the optical module to be gradually recover to a predetermined reference value when the Y-axis relative position coordinate value of the following mobile body is changed to be a threshold value or less.

8. The system of claim 6, wherein the optical module comprises a plurality of optical modules that are positioned at one or more sides of the mobile body, and wherein the processor is further configured to control the light quantity of the predetermined range area to be increased among the light quantity of the plurality of optical modules in response to another following mobile body, which is different from the following mobile body, not being positioned in the first area while being positioned directly behind the mobile body.

9. The system of claim 1, wherein the optical module comprises a plurality of optical modules that are positioned at various sides of the mobile body.

10. The system of claim 1, wherein the processor is further configured to control the light quantity emitted by the optical module by adjusting at least one of light intensity, light color, light flicker, or any combination thereof, based on the received relative position coordinate value in response to the other mobile body being within the predetermined range from the mobile body.

11. The system of claim 1, wherein the processor is further configured to control the light quantity emitted by the optical module based on the distance between the mobile body and the following mobile body.

12. The system of claim 1, further comprising:

a sensor configured to detect the relative position of the following mobile body and transmit the detected relative position to the processor, wherein the sensor or the optical module is positioned at least one of a rear of the mobile body, a front of the mobile body, a left side of the mobile body, or a right side of the mobile body, a top of the mobile body, or a bottom of the mobile body, or any combination thereof.

13. A processor-implemented control method of a lamp system for a mobile body which includes an optical module, the method comprising:

receiving, from a sensor in the mobile body, a relative position coordinate value of a following mobile body that is following the mobile body, relative to the sensor;

controlling the optical module, positioned at a rear of the mobile body, based on the received relative position coordinate value; and in response to the following mobile body being within a predetermined range area relative to the mobile body, controlling the optical module to emit light quantity based on the received relative position coordinate value of the following mobile body, wherein the optical module is positioned at a rear of the mobile body and visible from the following mobile body.

14. The method of claim 13, further comprising:

determining a position of the following mobile body based on an X-axis relative position coordinate value;

determining that the following mobile body is positioned directly behind the mobile body when the following mobile body is positioned in a first area which is a predetermined range area centered on the mobile body;

determining that the following mobile body is positioned at the left rear of the mobile body when the following mobile body is positioned in a second area which is a predetermined range area positioned on the left of the first area; and determining that the following mobile body positioned at the right rear of the mobile body when the following mobile body is positioned in a third area which is a predetermined range area positioned on the right of the first area.

15. The method of claim 14, further comprising:

controlling the light quantity of the optical module to be weaker based on a Y-axis relative position coordinate value in response to the following mobile body being positioned directly behind the mobile body; and increasing light quantity of an area excluding a predetermined range among the light quantity of the optical module in response to the following mobile body and another following mobile body not being positioned in any of the first area, the second area, and the third area while being positioned at the left or right rear of the mobile body;

calculating a final relative position coordinate value based on the X-axis and Y-axis relative position coordinate values; and controlling the light quantity of the optical module to be weaker based on the final relative position coordinate value in response to another following mobile body being positioned in the second area or the third area.

16. The method of claim 14, further comprising:

calculating a final relative position coordinate value based on the X-axis and Y-axis relative position coordinate values; and controlling the light quantity of the optical module to be weaker based on the final relative position coordinate value in response to the following mobile body being positioned at the left rear or the right rear of the mobile body.

17. The method of claim 16, further comprising controlling the light quantity of the optical module to be gradually recovered to a predetermined reference value in response to the Y-axis relative position coordinate value of the following mobile body being changed to be a threshold value or less.

18. The method of claim 16, wherein the optical module comprises a plurality of optical modules, and wherein the method further comprises controlling the light quantity of the predetermined range area to be increased among the light quantity of the plurality of optical modules in response to another following mobile body, which is different from the following mobile body, not being positioned in the first area while being positioned directly behind the mobile body.

* * * * *